Jan. 6, 1925.                                                            1,522,423
J. J. DECARLI
HAY LOADER
Filed Sept. 20, 1923        2 Sheets-Sheet 2
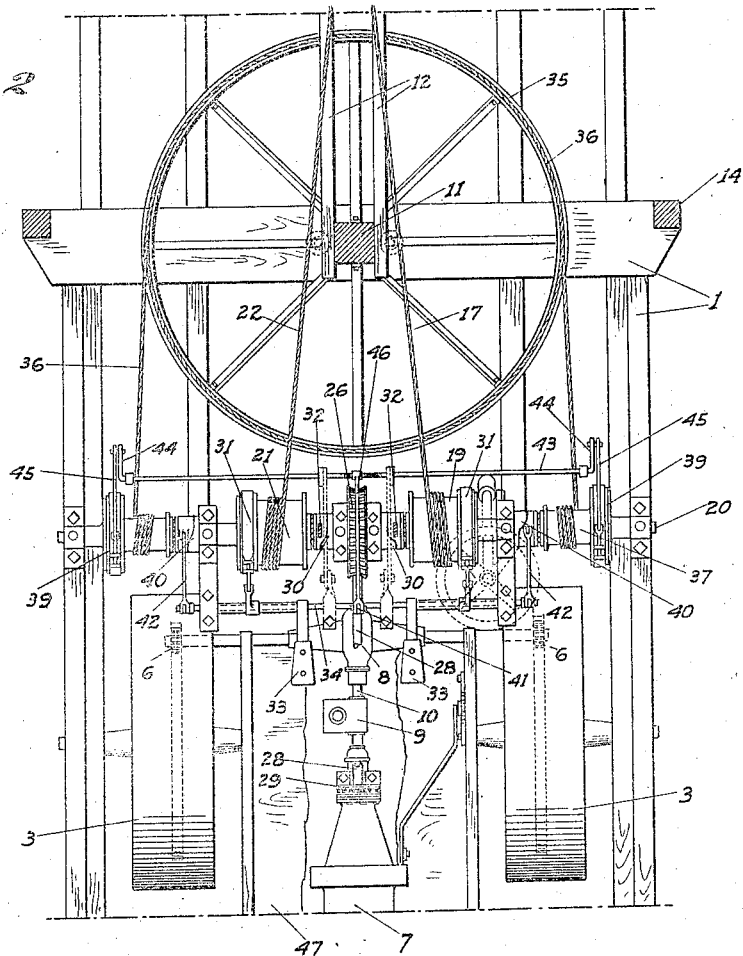
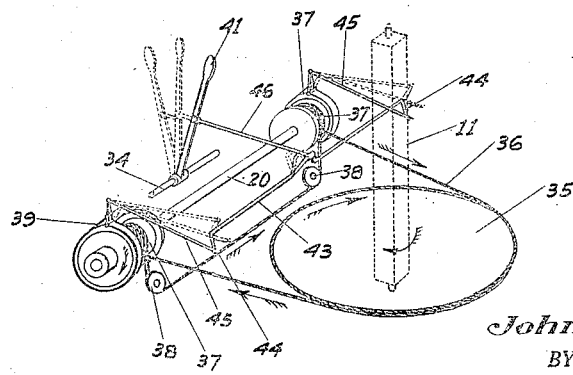
INVENTOR.
John J. Decarli
BY
ATTORNEY Patented Jan. 6, 1925.

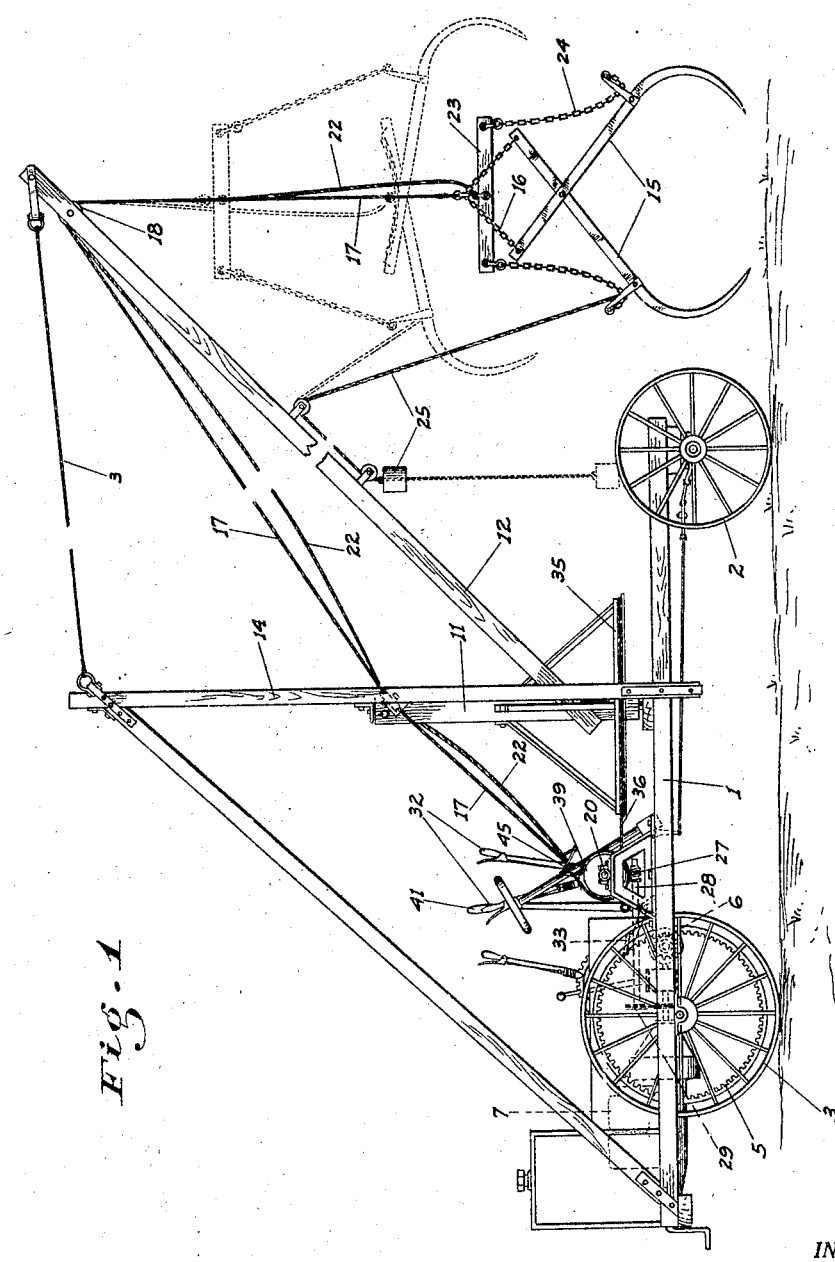

1,522,423

UNITED STATES PATENT OFFICE.

JOHN J. DECARLI, OF HOLT, CALIFORNIA.

HAY LOADER.

Application filed September 20, 1923. Serial No. 663,749.

*To all whom it may concern:*

Be it known that I, JOHN J. DECARLI, a citizen of the United States, residing at Holt, county of San Joaquin, State of California, have invented certain new and useful Improvements in Hay Loaders; and I do declare the following to be a full, clear, and exact description of the same, reference being had to the accompanying drawings, and to the characters of reference marked thereon, which form a part of this application.

This invention relates to improvements in loading devices, and particularly to one for loading hay and the like from the field after it has been cut, onto wagons for transportation.

After the hay has been cut and windrowed, it is stacked by suitable raking means into spaced piles, and the principal object of my invention is to provide a self-propelled vehicle, movable along the rows of hay-piles, having a power operated grab by means of which the hay of each pile may be quickly gathered, raised, and dumped into a hay wagon moving along with, and to one side of, my loading vehicle.

Another object is to provide a device of this character with the operating means so arranged that the services of one man on the vehicle are all that will be needed to steer and propel the vehicle, and operate the loading means, with but very little physical effort on his part being needed.

As a result, the cost and time of loading the hay is cut far below what is necessary with the equipment at present used.

I have also designed the mechanism of the apparatus so that a single power plane may be used to both propel the vehicle and operate the grab and the boom on which it is mounted.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved hay loader.

Fig. 2 is a partial top plan view of the same.

Fig. 3 is a diagrammatic perspective view of the boom-swinging mechanism and its control means.

Referring now more particularly to the characters of reference on the drawings, the numeral 1 denotes a suitable horizontal frame structure, supported on front and rear wheels 2 and 3 respectively, the former being steered after the manner of an automobile from a steering wheel 4. The rear wheels 3 have internal gears 5 therein, which mesh with pinions 6, driven from a power plant, such as a gas engine, 7, through the usual differential structure, the housing of which is shown at 8, and with an ordinary form of change-speed transmission 9 interposed in the drive shafting 10 of the engine.

Turnably mounted on the framework 1 intermediate the front and rear wheels is a vertical post 11, on the sides of which adjacent its lower end are fixed beams 12 together forming a boom which extends upwardly and at a forward angle to a point a suitable distance ahead of and above the front end of the vehicle. The upper end of this boom is braced by cable means 13 extending thence to a swivel connection with the upper end of a vertical frame structure 14 extending upwardly from the sides of the frame 1.

A suitable form of grab or fork is hung from the upper end of the beam, such grab preferably comprising fork arms 15 pivoted together intermediate their ends. To the upper ends of these arms are connected chains 16 or the like extending to a common connection with a cable 17 passing over a pulley 18 at the upper end of the boom and then down and about a drum 19 loosely mounted on a transverse shaft 20 journaled on the frame 1 to the rear of the post 11. This shaft has another drum 21, also loose thereon, from which a cable 22 extends over the boom and down to a cross bar 23 over the fork arms 15 and connected thereto by chains 24 or the like at points below the pivotal connection of said arms. It will therefore be seen that if the cable 17 is pulled upon, and the cable 22 slacked, the grab will first be closed about a load and then raised therewith. Then if the cable 22 is pulled out and the cable 17 slacked, the fork arms will be opened or spread apart and the load released. The grab is prevented from undesired swinging by weighted cable means 25 attached to the boom and grab.

The shaft 20 is driven from the engine by means of a worm wheel 26 on said shaft meshing with a worm 27 on a shaft 28 driven from the engine shaft 10 ahead of the transmission 9 by a chain or similar drive 29.

Each of the drums 19 and 21 has a clutch mechanism 30 whereby they may be independently coupled up to the shaft 20 and a brake mechanism 31 to prevent undesired rotation of the drums when the clutches are disengaged. The clutches are actuated by independent levers 32 and the brakes by independent pedal-levers 33 turnably mounted on a turnable shaft or rod 34 extending parallel to the shaft 20 to the rear of the same.

Mounted with the post 11 is a large horizontal sheave 35, concentric with the axis of the post.

An endless cable 36 is wound on spaced drums 37 free on the shaft 20.

From underneath the drums the cable passes around the sheave 35 one or more times, and from above the drums the cable passes through pulleys 38 set at right angles to the drums (see Fig. 3).

It will therefore be seen that with a rotation of either drum in the same direction, the cable 36 will be pulled one way or the other, causing the sheave and consequently the post and boom, to be rotated therewith.

Associated with each drum 37 is a brake mechanism 39 and with each drum and the shaft 20 a cam-clutch mechanism 40.

A single lever 41 is fixed on the shaft 34, the latter having arms 42 extending to the clutch mechanisms, the latter being so disposed that when the lever is moved ahead of a vertical line, the right hand clutch will be engaged and the other released and when the lever is moved to the rear of a vertical line, the left hand clutch will be engaged and the other released.

A turnable shaft 43 having right angle arms 44 is mounted ahead of and parallel to the shaft 20, said arms being in transverse alinement with the brake mechanisms and being connected thereto by rods 45, the brakes being set when the arms 44, which face away from the brakes, are in parallel alinement with the rods 45. The lever 41 is operatively connected to the shaft 43 to turn the same by suitable linkage 46, said lever, when the shaft 43 is moved to a brake setting position as above stated, being in a vertical or neutral position between its two clutch actuating positions.

It will therefore be evident, from the above described arrangement of parts, that when the lever is moved either ahead or back from its neutral brake setting position (in which position the clutches are both disconnected) the brakes will both be released.

The same end could of course be attained by the use of a multiplicity of levers, but by employing a single operating lever, the control of the swinging of the boom is made much simpler for the operator, and the number of parts in the machine is reduced.

The purpose of swinging the boom is of course to enable a load to be picked up or deposited to one side of the path of movement of the vehicle.

The object of the brakes associated with the swinging of the boom is to positively hold the latter in any position to which it has been swung, without the tendency of the boom to sway back and forth, and which would otherwise be present.

The different controls, both for propelling the vehicle as well as for operating the grab and swinging the boom, are all arranged so as to be within easy reach of a single operator, who stands on a platform 47 mounted above the axle of the wheels 3 and therebetween.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a hay loader having a vertical and turnably mounted post and a horizontal sheave fixed on the post, a driven shaft, drums normally loose on said shaft, cable means around the sheave and drums, cooperating clutch means on the shaft and drums, brake means for the drums, and a common means for actuating the clutch and brake means in a manner such that when either clutch is engaged the brakes will be simultaneously and automatically released, and vice versa.

2. In a hay loader having a vertical and turnably mounted post and a horizontal sheave fixed on the post, a driven shaft, drums normally loose on said shaft, cable means around the sheave and drums, cooperating clutch means on the shaft and drums, brake means for the drums, a single lever for actuating both clutches and brakes, and means whereby when either clutch is engaged both brakes will be automatically released, and when the brakes are applied both clutches will be automatically disengaged.

3. In a hay loader having a vertical and turnably mounted post and a horizontal sheave fixed on the post, a driven shaft, drums normally loose on said shaft, cable means around the sheave and drums, cooperating clutch means on the shaft and drums, brake means for the drums, and a single lever for actuating both the clutches and brakes; the clutches being arranged so that one is engaged with a movement of the lever in one direction and the other is engaged with a movement of the lever in the opposite direction, and both are disengaged when the lever is intermediate such engaging positions; the brakes being connected to the lever to be applied by the lever only when the latter is in said intermediate position.

In testimony whereof I affix my signature.

JOHN J. DECARLI.